(12) United States Patent
Erta et al.

(10) Patent No.: US 11,665,727 B2
(45) Date of Patent: May 30, 2023

(54) MITIGATING INTERFERENCE IN HIGH-DENSITY WIRELESS NETWORKS USING VARIABLE ATTENUATORS

(71) Applicant: Cisco Technology, Inc., San Jose, CA (US)

(72) Inventors: Alessandro Erta, Licciana Nardi (IT); Giancarlo Semino, Genoa (IT); Andrea Orioli, Milan (IT); Luca Bisti, Grosseto (IT)

(73) Assignee: Cisco Technology, Inc., San Jose, CA (US)

( * ) Notice: Subject to any disclaimer, the term of this patent is extended or adjusted under 35 U.S.C. 154(b) by 87 days.

(21) Appl. No.: 17/215,515

(22) Filed: Mar. 29, 2021

(65) Prior Publication Data

US 2022/0312423 A1    Sep. 29, 2022

(51) Int. Cl.
*H04W 72/541* (2023.01)
*G16Y 10/75* (2020.01)
*G16Y 10/40* (2020.01)
*G16Y 40/10* (2020.01)
*H04W 72/542* (2023.01)

(52) U.S. Cl.
CPC ........... *H04W 72/541* (2023.01); *G16Y 10/40* (2020.01); *G16Y 10/75* (2020.01); *G16Y 40/10* (2020.01); *H04W 72/542* (2023.01)

(58) Field of Classification Search
CPC .. H04W 72/082; H04W 72/085; G16Y 40/10; G16Y 10/40; G16Y 10/75
See application file for complete search history.

(56) References Cited

U.S. PATENT DOCUMENTS

| | | |
|---|---|---|
| 8,116,758 B2 | 2/2012 | Mlinarsky et al. |
| 8,331,977 B2 | 12/2012 | Douglas et al. |
| 9,374,791 B2 | 6/2016 | Yavuz et al. |
| 9,544,857 B2 | 1/2017 | Carter et al. |
| 10,164,756 B2 | 12/2018 | Baker et al. |
| 2012/0039212 A1* | 2/2012 | Kaliyaperumal ..... H04W 88/16 370/254 |

(Continued)

FOREIGN PATENT DOCUMENTS

CN    102428720 A  *  4/2012  ........... H04L 5/0007

OTHER PUBLICATIONS

Joosting, Jean-Pierre, "Variable Attenuator Covers WiFi 6E Bands", online: https://www.mwee.com/news/variable-attenuator-covers-wifi-6e-bands, Jun. 4, 2020, 1 page.

*Primary Examiner* — Zhensheng Zhang
(74) *Attorney, Agent, or Firm* — Behmke Innovation Group LLC; Kenneth J. Heywood; Jonathon P. Western

(57) ABSTRACT

In one embodiment, a supervisory process receives wireless signal quality measurements obtained by a particular node of a wireless network. The wireless network comprising a plurality of mobile nodes. The supervisory process computes, based on the wireless signal quality measurements, an optimal amount of radio frequency attenuation that the particular node should use. The supervisory process generates an attenuation configuration for the particular node that specifies the optimal amount of radio frequency attenuation that the particular node should use. The supervisory process pushes the attenuation configuration to a variable attenuator of the particular node.

18 Claims, 9 Drawing Sheets

(56) References Cited

U.S. PATENT DOCUMENTS

| | | |
|---|---|---|
| 2016/0119110 A1 | 4/2016 | Kim et al. |
| 2017/0048805 A1 | 2/2017 | Davey |
| 2017/0187513 A9 | 6/2017 | Bharadia et al. |
| 2021/0136698 A1* | 5/2021 | Davey ................. H04W 52/245 |

* cited by examiner

| Control Voltage Input | | | | Attenuation State |
|---|---|---|---|---|
| V1 8 dB | V2 4 dB | V3 2 dB | V4 1 dB | RF1 - RF2 |
| | | | | Reference I.L. |
| High | High | High | High | 1 dB |
| High | High | High | Low | 2 dB |
| High | High | Low | High | 4 dB |
| High | Low | High | High | 8 dB |
| Low | Low | Low | Low | 15 dB |
| Any combination of the above states will provide an attenuation approximately equal to the sum of the bits selected. | | | | |

MITIGATING INTERFERENCE IN HIGH-DENSITY WIRELESS NETWORKS USING VARIABLE ATTENUATORS

TECHNICAL FIELD

The present disclosure relates generally to computer networks, and, more particularly, to mitigating interference in high-density wireless networks using variable attenuators.

BACKGROUND

The Internet of Things, or "IoT" for short, represents an evolution of computer networks that seeks to connect many everyday objects to the Internet. Notably, there has been a recent proliferation of 'smart' devices that are Internet-capable such as thermostats, lighting, televisions, cameras, and the like. In many implementations, these devices may also communicate with one another. For example, an IoT motion sensor may communicate with one or more smart lightbulbs, to actuate the lighting in a room when a person enters the room. Vehicles are another class of 'things' that are being connected via the IoT for purposes of sharing sensor data, implementing self-driving capabilities, monitoring, and the like.

In high-density deployments, wireless nodes may interfere with one another. To combat this, many wireless networks utilize approaches such as frequency hopping, so that clients communicate on different wireless frequencies. However, certain IoT deployments require access points and clients to communicate using the same frequency or a very limited number of frequencies. For instance, automation systems with autonomous vehicles often employ access points and mobile clients that are configured to communicate using the same frequency. In these and other types of wireless networks where clients are highly-mobile and utilize the same frequency/frequencies, interference can still present itself.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
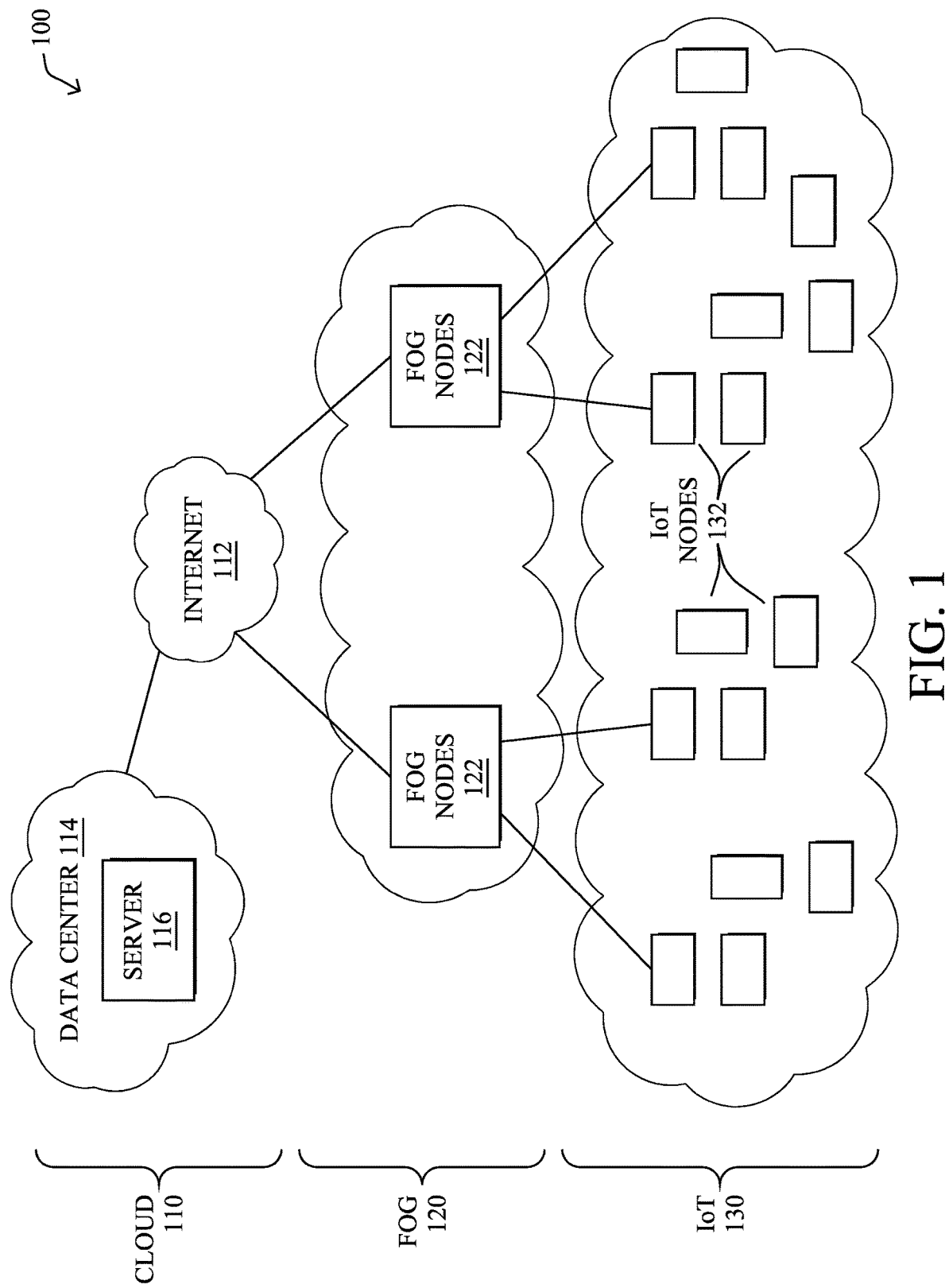
FIG. 1 illustrate an example computer network.

According to one or more embodiments of the disclosure, a supervisory process receives wireless signal quality measurements obtained by a particular node of a wireless network. The wireless network comprising a plurality of mobile nodes. The supervisory process computes, based on the wireless signal quality measurements, an optimal amount of radio frequency attenuation that the particular node should use. The supervisory process generates an attenuation configuration for the particular node that specifies the optimal amount of radio frequency attenuation that the particular node should use. The supervisory process pushes the attenuation configuration to a variable attenuator of the particular node.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or PLC networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Fog computing is a distributed approach of cloud implementation that acts as an intermediate layer from local networks (e.g., IoT networks) to the cloud (e.g., centralized and/or shared resources, as will be understood by those skilled in the art). That is, generally, fog computing entails using devices at the network edge to provide application services, including computation, networking, and storage, to the local nodes in the network, in contrast to cloud-based approaches that rely on remote data centers/cloud environments for the services. To this end, a fog node is a functional node that is deployed close to fog endpoints to provide computing, storage, and networking resources and services. Multiple fog nodes organized or configured together form a fog system, to implement a particular solution. Fog nodes and fog systems can have the same or complementary capabilities, in various implementations. That is, each individual fog node does not have to implement the entire spectrum of capabilities. Instead, the fog capabilities may be distributed across multiple fog nodes and systems, which may collaborate to help each other to provide the desired services. In other words, a fog system can include any number of virtualized services and/or data stores that are spread across the distributed fog nodes. This may include a master-slave configuration, publish-subscribe configuration, or peer-to-peer configuration.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid advanced metering infrastructure (AMI), smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

FIG. 1 is a schematic block diagram of an example simplified computer network 100 illustratively comprising nodes/devices at various levels of the network, interconnected by various methods of communication. For instance, the links may be wired links or shared media (e.g., wireless links, PLC links, etc.) where certain nodes, such as, e.g., routers, sensors, computers, etc., may be in communication with other devices, e.g., based on connectivity, distance, signal strength, current operational status, location, etc.

Specifically, as shown in the example network 100, three illustrative layers are shown, namely cloud layer 110, fog layer 120, and IoT device layer 130. Illustratively, cloud layer 110 may comprise general connectivity via the Internet 112, and may contain one or more datacenters 114 with one or more centralized servers 116 or other devices, as will be appreciated by those skilled in the art. Within the fog layer 120, various fog nodes/devices 122 (e.g., with fog modules, described below) may execute various fog computing resources on network edge devices, as opposed to datacenter/cloud-based servers or on the endpoint nodes 132 themselves of the IoT device layer 130. Data packets (e.g., traffic and/or messages sent between the devices/nodes) may be exchanged among the nodes/devices of the computer network 100 using predefined network communication protocols such as certain known wired protocols, wireless protocols, PLC protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Data packets (e.g., traffic and/or messages) may be exchanged among the nodes/devices of the computer network 100 using predefined network communication protocols such as certain known wired protocols, wireless protocols (e.g., IEEE Std. 802.15.4, Wi-Fi, Bluetooth®, DECT-Ultra Low Energy, LoRa, etc.), PLC protocols, or other shared-media protocols where appropriate. In this context, a protocol consists of a set of rules defining how the nodes interact with each other.

Figure 2:
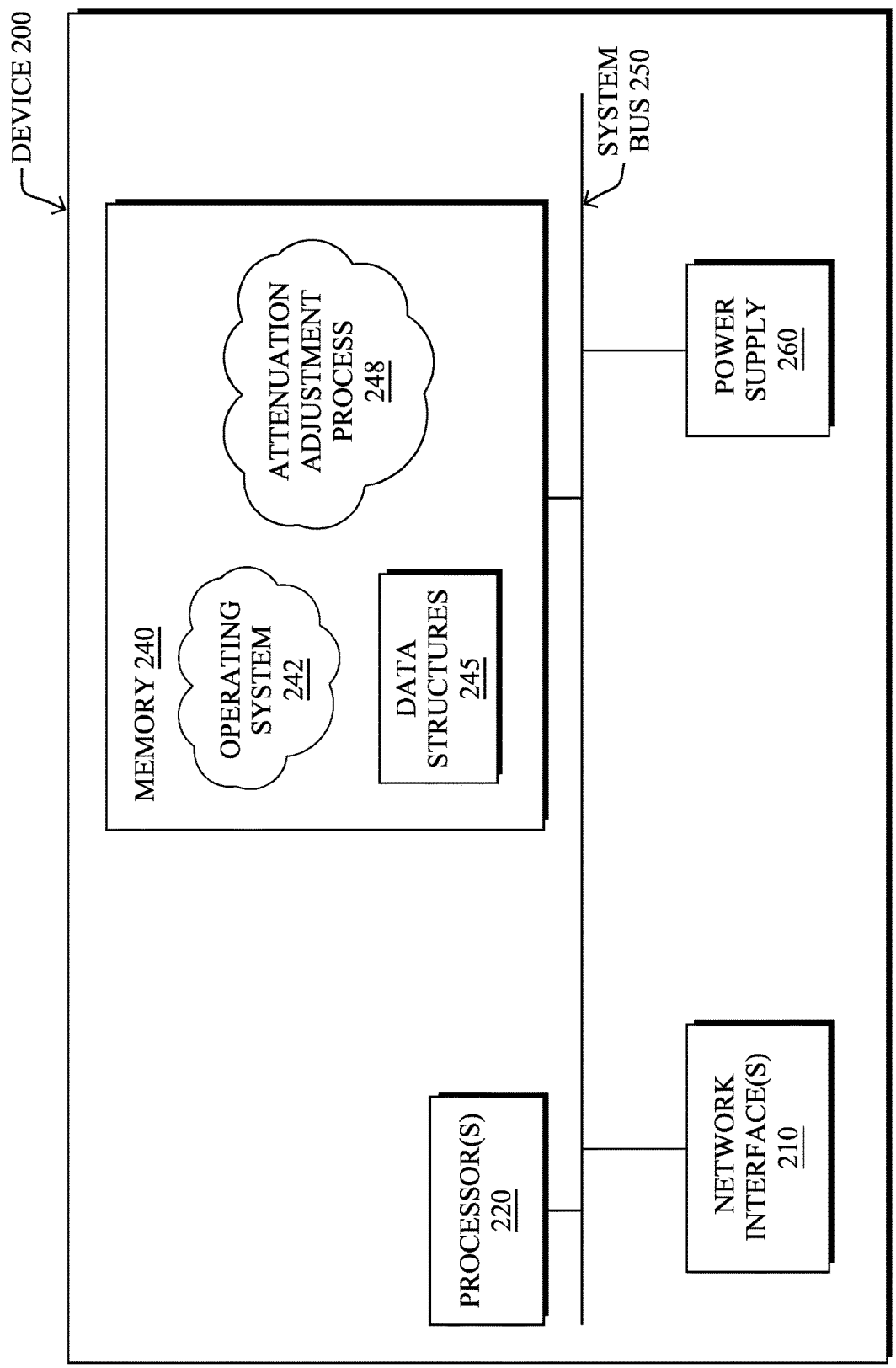
FIG. 2 illustrates an example network device/node.

FIG. 2 is a schematic block diagram of an example node/device 200 that may be used with one or more embodiments described herein, e.g., as any of the nodes or devices shown in FIG. 1 above or described in further detail below. The device 200 may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

Network interface(s) 210 include the mechanical, electrical, and signaling circuitry for communicating data over links coupled to the network. The network interfaces 210 may be configured to transmit and/or receive data using a variety of different communication protocols, such as TCP/IP, UDP, etc. Note that the device 200 may have multiple different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes/services may comprise an illustrative attenuation adjustment process 248, as described herein. Note that while process 248 is shown in centralized memory 240 alternative embodiments provide for the process to be specifically operated within the network interface(s) 210.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

According to various embodiments, as described in greater detail below, a node of a wireless network (e.g., an access point, a client, etc.) may be equipped with a software-controllable, radio frequency attenuator. During execution, attenuation adjustment process 248 may adaptively determine an amount of attenuation that the attenuator of a node of a wireless network should employ, based on various measurements obtained from the wireless network. In some embodiments, the amount of attenuation may be variable and dependent on the location of the node, the time of day, the day of the week, combinations thereof, or the like.

In various embodiments, attenuation adjustment process 248 may dynamically compute and adjust the amount of attenuation for a particular node by utilizing machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, attenuation adjustment process 248 may employ one or more supervised, unsupervised, or semi-supervised machine learning models. Generally, supervised learning entails the use of a training set of data, as noted above, that is used to train the model to apply labels to the input data. For example, the training data may include sample measurements from a wireless network that have been labeled as 'acceptable' or 'not acceptable,' as well as their associated amounts of attenuation that were used. On the other end of the spectrum are unsupervised techniques that do not require a training set of labels. Notably, while a supervised learning model may look for previously seen patterns that have been labeled as such, an unsupervised model may instead look to the underlying behavior of the data, such as how sets of measurements are inter-related and/or change over time. Semi-supervised learning models take a middle ground approach that uses a greatly reduced set of labeled training data.

Example machine learning techniques that attenuation adjustment process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression techniques, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

Figure 3:
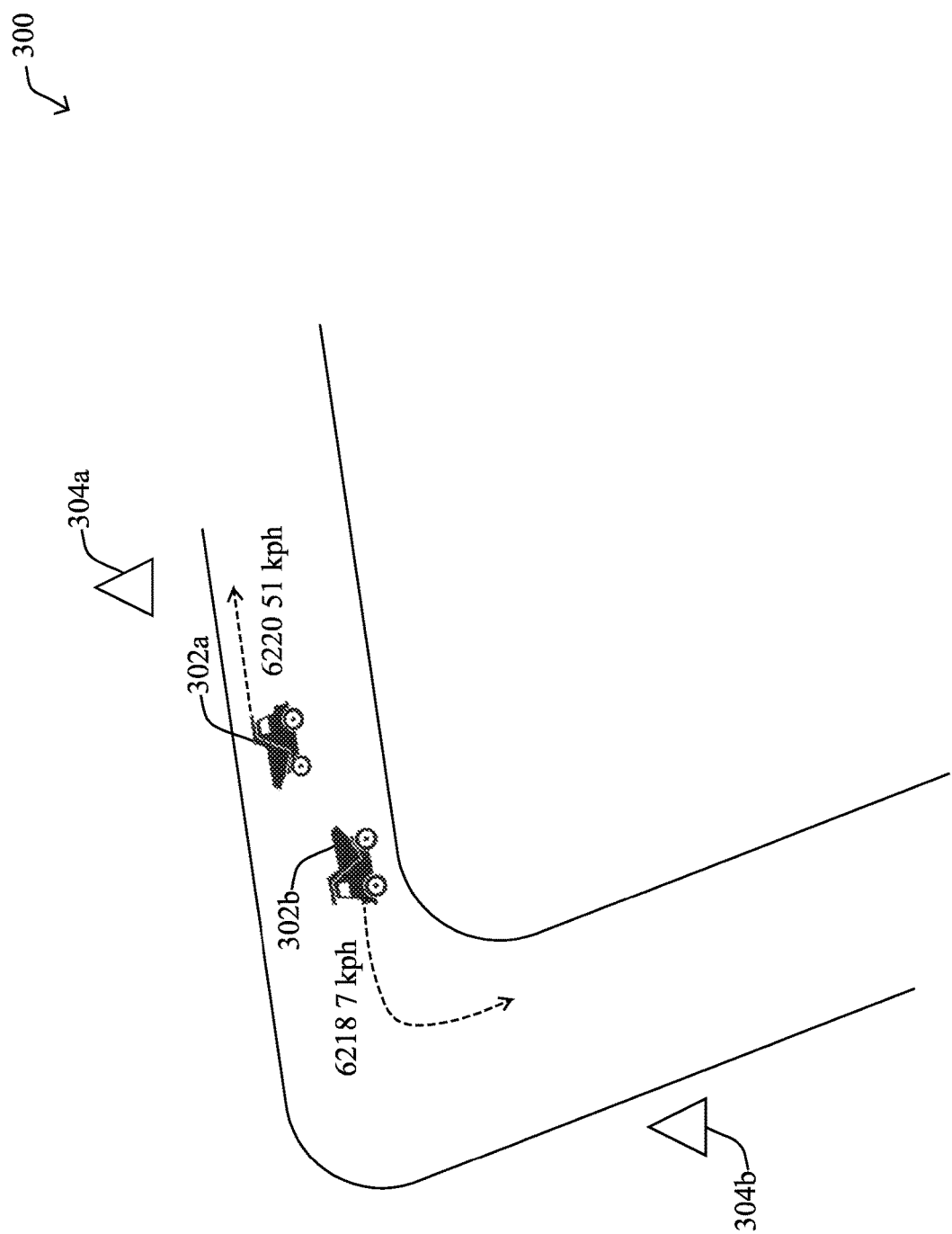
FIG. 3 illustrates an example industrial setting in which a wireless mesh network is located.

By way of example of connecting hardwired devices to a wireless mesh network, consider the case illustrated in FIG. 3. As shown, a number of autonomous vehicles 302a-302b may be deployed in an industrial setting 300. For example, if industrial setting 300 is a mine, autonomous vehicles 302a-302b may be autonomous trucks or carts. Each of autonomous vehicles 302a-302b may include its own hardwired network, such as a Controller Area Network (CAN) Bus, Ethernet, or the like, that allow the various components of the vehicle to communicate with one another. For example, a plurality of sensors on vehicle 302a may send sensor readings to an onboard navigation system that controls the steering and acceleration of vehicle 302a within industrial setting 300 via a local hardwired network of vehicle 302a.

Distributed throughout industrial setting 300 may be any number of wireless access points 304, such as wireless access points 304a-304b, that form a wireless mesh network. In some embodiments, the access points 304 may be autonomous access points that self-organize into a wireless mesh. For example, certain access points 304 may function as mesh access points (MAPs) and arrange themselves into a wireless mesh rooted at a root access point (RAP).

During operation, the access point bridge local to a vehicle 302 may attach to one of the access points 304 in the wireless mesh, allowing communications to be passed wirelessly to and from the vehicle 302 and between the bridge and the wired network of the vehicle 302. As a vehicle 302 travels within industrial setting 300, it may roam from access point 304 to access point 304, based the radio signal quality observed for those access points 304.

As noted above, many deployments of autonomous vehicles experience interference between their wireless nodes, especially in cases in which there is a high density of nodes within a certain area. For instance, some deployments (e.g., warehouses, amusement park rides, etc.) can have upwards of fifty autonomous vehicles all moving within a relatively small physical area. To complicate the interference problem further, these types of deployments often rely on a single communication frequency or only a small set of frequencies. This means that communications between a particular mobile node and access point may experience, if it is within close proximity of another mobile node or access point.

For instance, assume that vehicle 302b is communicating with access point 304b on a particular frequency and that vehicle 302a is also communicating with access point 304a on that same frequency. If both vehicles 302a-302b are within range of one another, this can lead to interference, thereby causing packet loss and other negative effects on the wireless communications.

Figure 4:
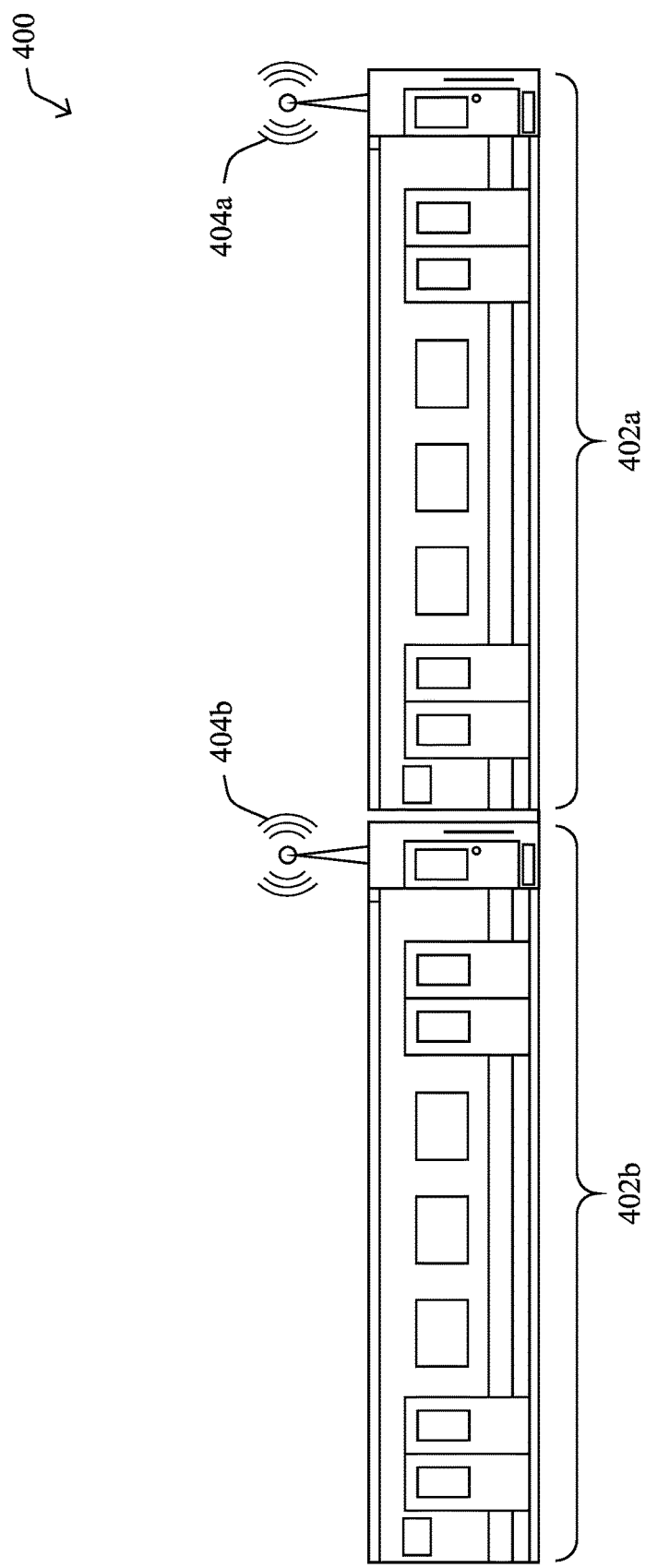
FIG. 4 illustrates an example vehicle employing wireless communications.

FIG. 4 illustrates another example of a vehicle employing wireless communications that can lead to interference conditions, according to various embodiments. As shown, vehicle 400 may take the form of a train having cars 402a-402b. Recently, there has been a push to connect trains to the Internet. Doing so allows for greater monitoring and control over the trains, as well as provide connectivity to the passengers of the trains. Indeed, by connecting the trains to the Internet, train passengers can continue to access the Internet, even when the train is passing through tunnels and other locations that may not have cellular reception.

While new trains are often equipped today with on-board, cabled networks, older trains require some retrofitting to enable wireless network connectivity. Typically, this is done by outfitting each car of the train with its own wireless bridge. For instance, train car 402a may be equipped with a first wireless bridge 404a, train car 402b may be equipped with a second wireless bridge 404b, etc., that provide the connectivity that a cabled network would otherwise provide in a new train.

Similar to the previous case of autonomous vehicle communications, intra-train car communication systems have also been found to experience interference, as their wireless bridges are often within relatively close proximity of one another.

Mitigating Interference Using Variable Attenuators

The techniques introduced herein leverage software-controllable, variable attenuators on nodes of a wireless network, to mitigate against interference conditions in high-density deployments. In some aspects, the techniques herein can be used to determine the optimum amount of attenuation that a node should use, potentially at any given time and/or location, thereby reducing or even eliminating the interference conditions between the node and other nodes in the network.

Illustratively, the techniques described herein may be performed by hardware, software, and/or firmware, such as in accordance with the attenuation adjustment process 248, which may include computer executable instructions executed by the processor 220 (or independent processor of interfaces 210) to perform functions relating to the techniques described herein.

Specifically, according to various embodiments, a supervisory process receives wireless signal quality measurements obtained by a particular node of a wireless network. The wireless network comprising a plurality of mobile nodes. The supervisory process computes, based on the wireless signal quality measurements, an optimal amount of radio frequency attenuation that the particular node should use. The supervisory process generates an attenuation configuration for the particular node that specifies the optimal amount of radio frequency attenuation that the particular node should use. The supervisory process pushes the attenuation configuration to a variable attenuator of the particular node.

Figure 5:
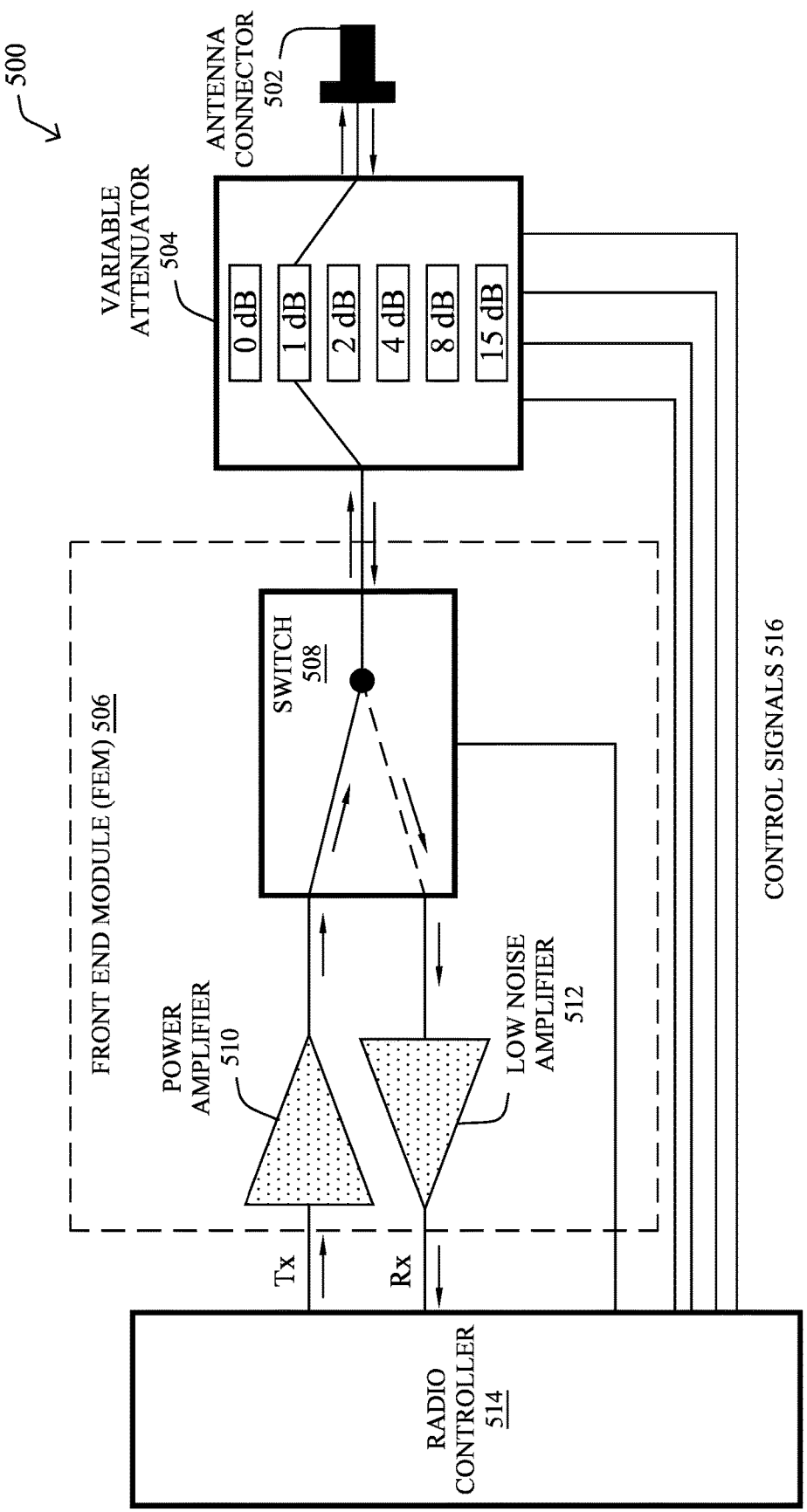
FIG. 5 illustrates an example simplified diagram of a wireless transceiver with a variable attenuator.

Operationally, FIG. 5 illustrates an example simplified diagram of a wireless transceiver with a variable attenuator, according to various embodiments. As shown, wireless transceiver 500 may generally include a radio controller 514 (e.g., a processor or other control circuitry), a front end module (FEM) 506, and an antenna connector 502 that relays radio frequency (RF) signals to and from an antenna element (not shown). During the transmit (Tx) operation, radio controller 514 may send a signal towards antenna connector 502 for transmission to a remote receiver node. As shown, a power amplifier 510 of FEM 506 will typically amplify this signal, prior to transmission.

Similarly, during a receive (Rx) operation, wireless transceiver 500 may receive an RF signal from the antenna. In turn, antenna connector 502 may supply the received signal to FEM 506, where a low noise amplifier 512 may amplify the signal, prior to providing the amplified signal to radio controller 514 for further processing. A switch 508 may also be present as part of FEM 506, to allow radio controller 514 to switch wireless transceiver 500 between its receive mode of operation and its transmit mode of operation.

According to various embodiments, wireless transceiver 500 may also include a variable attenuator 504 that is controllable by radio controller 514 and applies an amount of attenuation to the transmitted RF signal generated by wireless transceiver 500 and/or an RF signal received by wireless transceiver 500. For instance, as shown, variable attenuator 504 may be configured to provide the following levels of attenuation, depending on the control signals 516 sent to variable attenuator 504 by radio controller 514:
  0 dB
  1 dB
  2 dB
  4 dB
  8 dB
  15 dB As would be appreciated, the above amounts of attenuation are illustrative only and variable attenuator 504 may be configured to provide other amounts of attenuation, as desired. Further, while variable attenuator 504 is shown as being located between FEM 506 and antenna connector 502, other embodiments provide for variable attenuator 504 to be implemented elsewhere in wireless transceiver 500, such as part of amplifiers 510-512, between FEM 506 and radio controller 514, etc.

Figures 6A, 6B:
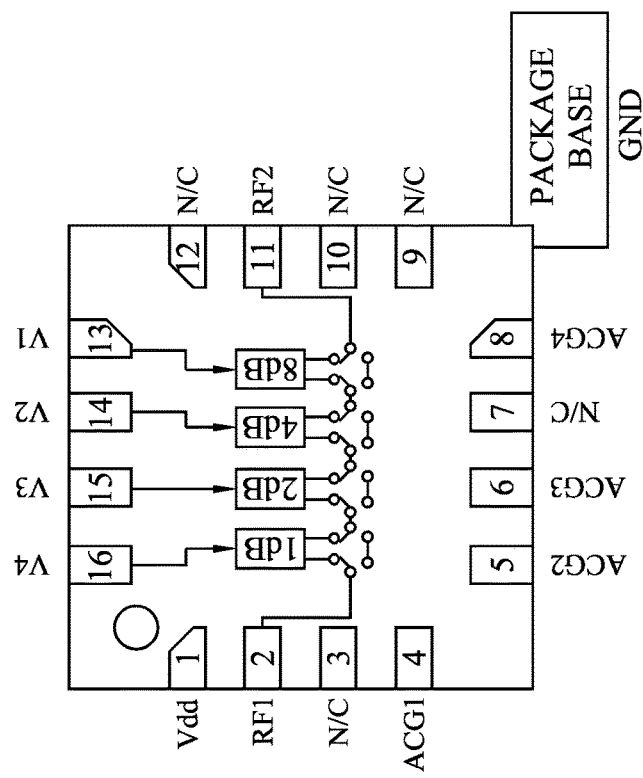
FIGS. 6A-6B illustrate examples of the control of a variable attenuator.

FIGS. 6A-6B illustrate examples of the control of a variable attenuator, according to various embodiments. More specifically, FIG. 6A illustrates an example circuit diagram for a variable attenuator 600. Likewise, FIG. 6B illustrates an example truth table 610 for the operation of variable attenuator 600. As shown, variable attenuator 600 may include various pins, such as the following:

Vdd—this is the supply voltage pin for variable attenuator 600.

RF1—this is the pin via which the RF signal is conveyed to/from the backend circuitry of the transceiver (e.g., to the front end module, etc.).

RF2—this is the pin via which the RF signal is conveyed to/from the antenna connector of the transceiver.

V1-V4—these pins control the amount of attenuation that variable attenuator 600 provides to the RF signal that traverses pins RF1-RF2, according to truth table 610.

ACG1-ACG4—these pins can be used to control the gain of variable attenuator 600, if so desired.

N/C—these pins are not connected (N/C).

In addition, the package base of variable attenuator 600 can serve as the ground (GND), as shown. As would be appreciated, the specific configuration of variable attenuator 600 is representative only and other configurations can be implemented in a similar manner, such as to provide different amounts of attenuation to the RF signals.

Truth table 610 in FIG. 6B illustrates the various operational modes of variable attenuator 600. Here, the V1 pin of variable attenuator 600 may control 8 dB of attenuation, the V2 pin may control 4 dB of attenuation, the V3 pin may control 2 dB of attenuation, and the V4 pin may control 1 dB of attenuation. When all four of these pins are set to 'High,' that is, there is voltage supplied to the pin, variable attenuator 600 will provide essentially no attenuation to the RF signal. However, when the control voltage is removed to a given pin, i.e., its 'Low' state, variable attenuator 600 will provide the corresponding amount of attenuation to the RF signal. Likewise, combinations of the pin states will result in an amount of attenuation approximately equal to the sum of the attenuations for the individual pins. For instance, when all four of pins V1-V4 are set to 'Low,' variable attenuator 600 will provide 15 dB of attenuation to the RF signal.

Figure 7A:
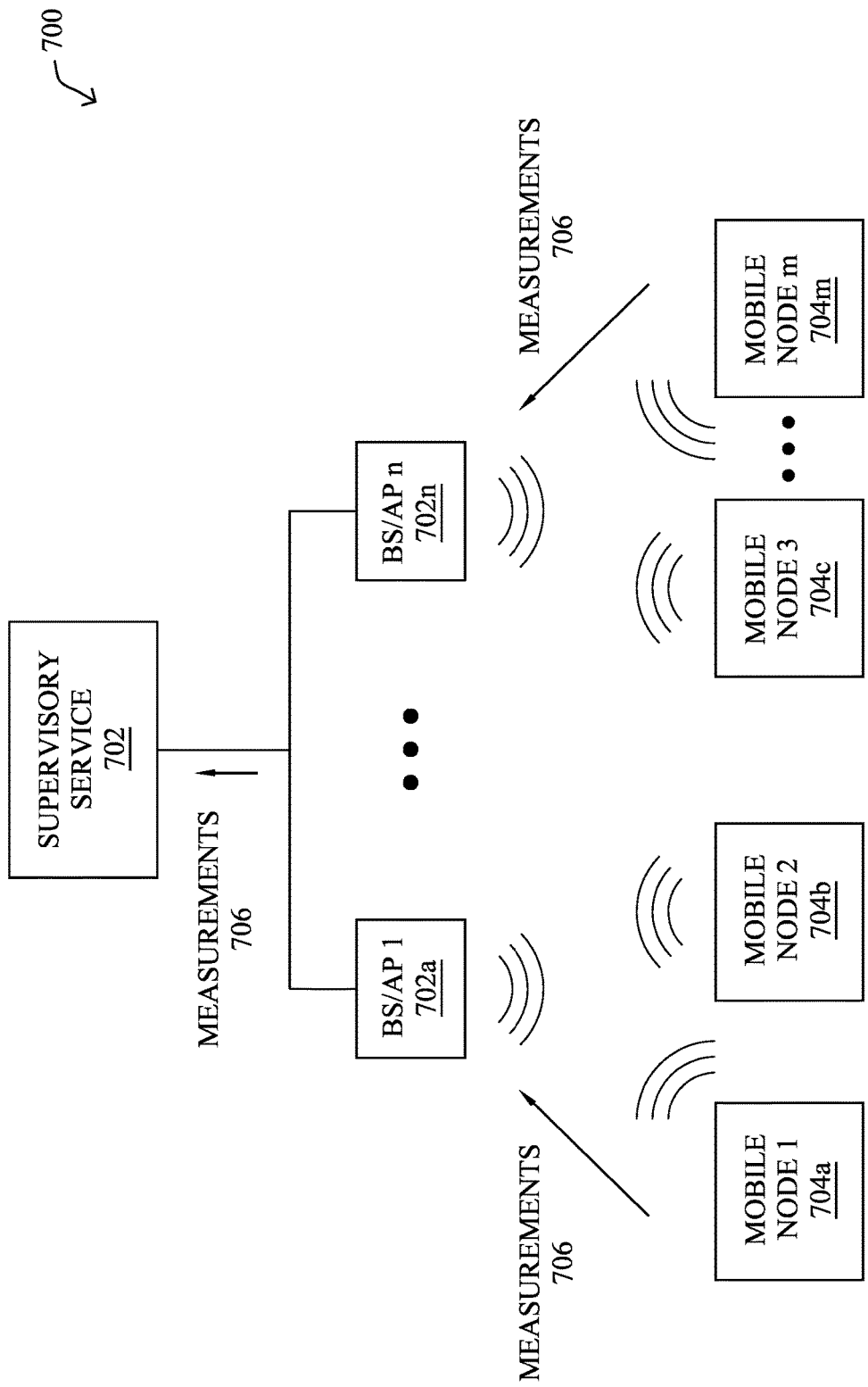
FIGS. 7A-7B illustrate an example of the control of variable attenuation by a wireless node.
Figure 7B:
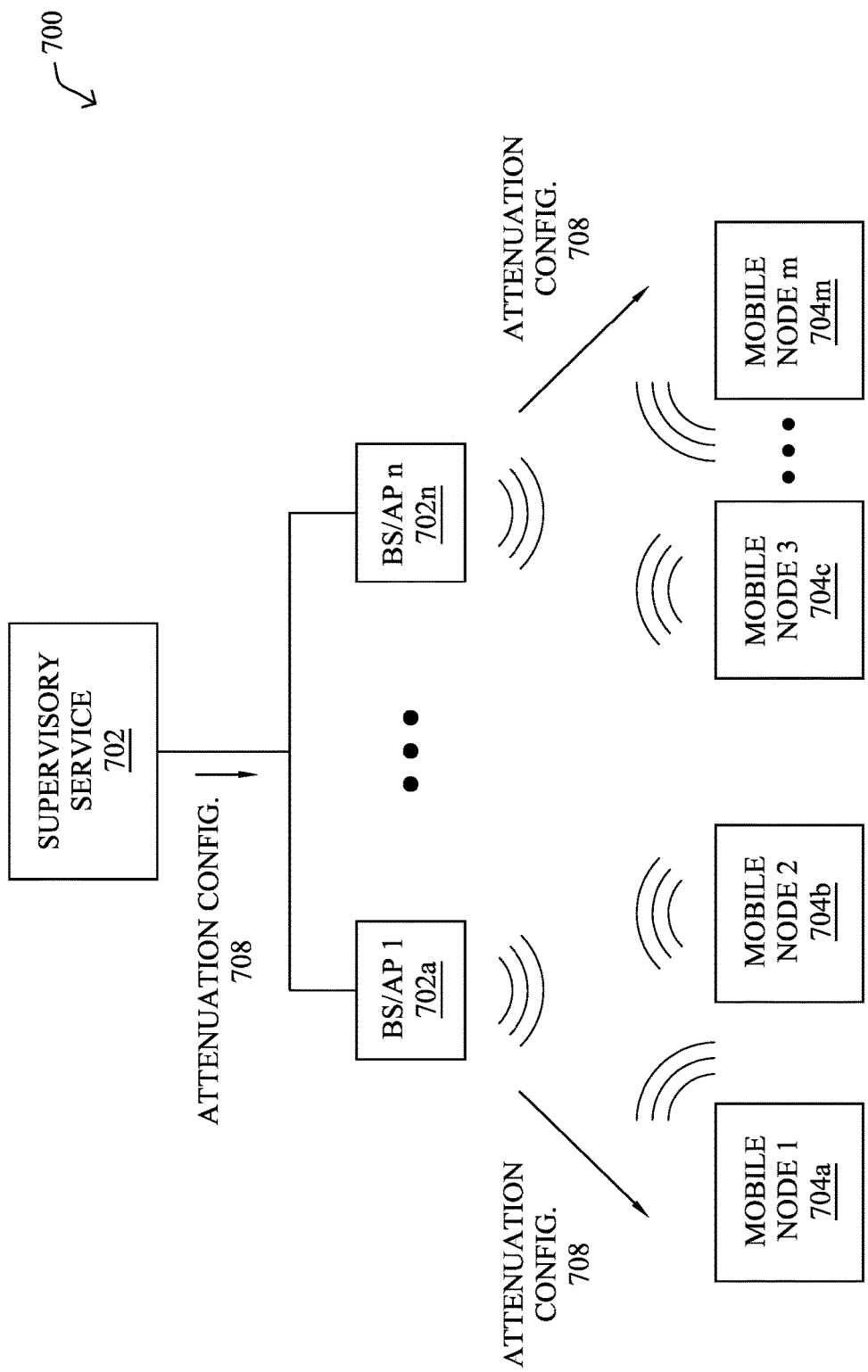

FIGS. 7A-7B illustrate an example of the triggering of wireless roaming in a network, according to various embodiments. As shown in FIG. 7A, assume that there is a wireless network 700 in which n-number of access points (APs) 702 are located (e.g., a first AP 702a through $n^{th}$ AP 702n). Depending on the type of wireless network, APs 702 may also be referred to as "base stations." In addition to APs 702, there may be m-number of mobile nodes 704 (e.g., a first mobile node 704a, a second mobile node 704b, a third mobile node 704c, etc., through $m^{th}$ mobile node 704m. Collectively, APs 702 and mobile nodes 704 are referred to herein as wireless nodes 706.

Typically, APs 702 will be located at fixed locations, while mobile nodes 704 may alternate between being in stationary and in-motion states. Thus, as a given mobile node 704 moves, it may attach itself to different ones of APs 702. This roaming mechanism may be based, for instance, on the received signal strength indicator (RSSI) measurements associated with the various APs 702 or other factors, as desired.

The movement of mobile nodes 704 may be independent of one another or, alternatively, relative to one another. For instance, in some cases, a plurality of mobile nodes 704 may be located on the same moving vehicle or other device (e.g., a robot, etc.), thereby traveling together as a group, as in the case of wireless bridges on different cars of a train. In other cases, some or all of mobile nodes 704 may move independently along a predetermined path of travel, roaming between APs 702 as they do so.

According to various embodiments, any or all of the various wireless nodes 706 of wireless network 700 may be equipped with transceivers that include controllable, variable attenuators, as described previously. To provide control over these attenuator(s), there may also be a supervisory service 708 that is responsible for pushing configurations to these attenuator(s). Preferably, supervisory service 708 may take the form of a centralized service that is in communication with any or all of wireless nodes 706. For instance, supervisory service 708 may be hosted by one or more computing device located directly within wireless network 700 or remotely, such as in the cloud or a remote datacenter.

During operation, wireless nodes 706 may take and send measurements 710 regarding wireless network 700 to supervisory service 708 for analysis. In various embodiments, measurements 710 may comprise any or all of the following key performance indicators (KPIs)/wireless signal quality measurements regarding the wireless communications in wireless network 700:

Relative RSSI level measurements

Link Error Rate (LER) measurements

Packet Error Rate (PER) measurements

Throughput measurements

In further embodiments, measurements 710 may also include location information for a given wireless nodes 706. For instance, measurements 710 may include self-reported coordinates, such as Global Positioning System (GPS) coordinates, known locations of fixed nodes 706 (e.g., APs 702), and/or location information obtained according to the wireless protocol in use in wireless network 700 (e.g., 802.11mc, etc.).

In response to receiving measurements 710, supervisory service 708 may compute an optimal amount of attenuation that a particular wireless node 706 should use. In some embodiments, supervisory service 708 may do so based solely on the measurements 710 associated with that node 706 and/or the node(s) 706 with which it communicates. In further embodiments, supervisory service 708 may base this computation on measurements 710 associated with other nodes 706, as well. For instance, assume that one mobile node 704 is located at a particular location in wireless network 700 and provides measurements 710 to supervisory service 708. If another mobile node 704 is located at the same location or is approaching that location at a later time, supervisory service 708 may use the measurements 710 from the former wireless nodes 706 to determine the amount of attenuation that the latter wireless nodes 706 should use.

In general, the wireless signal quality measurements and the amount of attenuation are correlated with one another. Accordingly, supervisory service 708 may treat the selection process for an amount of attenuation as an optimization problem that seeks the amount of attenuation that decreases the LER, PER, etc. experienced by a wireless node 706. In cases in which the location of the wireless nodes 706 are also known, supervisory service 708 may also associate the computed amounts of attenuation with specific locations (e.g., mobile node 704a should use an attenuation of X dB when located at location Y, etc.). Similarly, supervisory service 708 may also associate a time range to the computed attenuation, such as when measurements 710 are time-stamped and exhibit variations over time for a particular location.

In one embodiment, supervisory service 708 may compute the attenuation for a mobile node 704 such that the RSSI level remains substantially constant as it moves towards a particular AP 702. Indeed, the measured RSSI typically increases as a mobile node approaches an AP, which can potentially saturate the RF front-end of the node.

In another embodiment, supervisory service 708 may compute amounts of attenuation to be used by wireless nodes 706 so as to maximize or minimize an objective function that represents one or more of measurements 710. For instance, supervisory service 708 may attempt to compute attenuations for wireless nodes 706 on a global scale or for a particular area, to minimize the LER and/or PER, to maximize the throughput, etc.

To aid in the modeling of the relationships between measurements 710 and the amounts of attenuation used by wireless nodes 706, supervisory service 708 may also leverage machine learning, to identify the optimal attenuation values for wireless nodes 706. For instance, supervisory service 708 may model these relationships using a decision tree or random forest, neural network or deep network, regression model, or the like, to determine the amount of attenuation that a particular wireless node 706 should use.

Once supervisory service 708 has computed the amounts of attenuation that wireless nodes 706 should use, it may generate and push corresponding attenuation configurations 712 to them, as shown in FIG. 7B. In turn, the receiving wireless nodes 706 may use corresponding attenuation configurations 712 to control their variable attenuators, accordingly. For instance, assume that mobile nodes 704a-704b are located on autonomous vehicles in close proximity of one another. By adjusting the amount of attenuation that either or both of these nodes use, supervisory service 708 can help to reduce or eliminate the amount of interference that 704a-704b cause one another.

In some instances, corresponding attenuation configurations 712 may also specify different sets of optimal attenuation values, as well as the conditions under which a particular wireless node 706 should use them. For instance, corresponding attenuation configurations 712 sent to first mobile node 704a may indicate that it should attenuate its RF signals (transmit and/or receive) by 8 dB when at a certain location and/or at a certain time of day (e.g., during times of high congestion in the area, etc.).

In various embodiments, the reporting of measurements 710 to supervisory service 708 and the pushing of corresponding attenuation configurations 712 to wireless nodes 706 may form a control loop. Such a control loop may be executed in real time (e.g., on a continuous basis), periodically, or on demand, as desired.

As would be appreciated, other configurations are also possible for wireless network 700 and the implementation of the attenuation-adjustment techniques herein, according to further embodiments. For instance, while wireless network 700 is shown with nodes that comprise access points and mobile nodes, other instances of a wireless network may comprise fixed clients/nodes, as well. In addition, while supervisory service 708 is shown as a separate service from that of APs 702 and mobile nodes 704, other embodiments provide for supervisory service 708 to be executed directly by a particular AP or mobile node, or in a distributed manner across such devices. For instance, a mobile vehicle on which one or more of mobile nodes 704 are installed may also host supervisory service 708 for purposes of controlling the amount of attenuation used by each of the onboard node(s).

Figure 8:
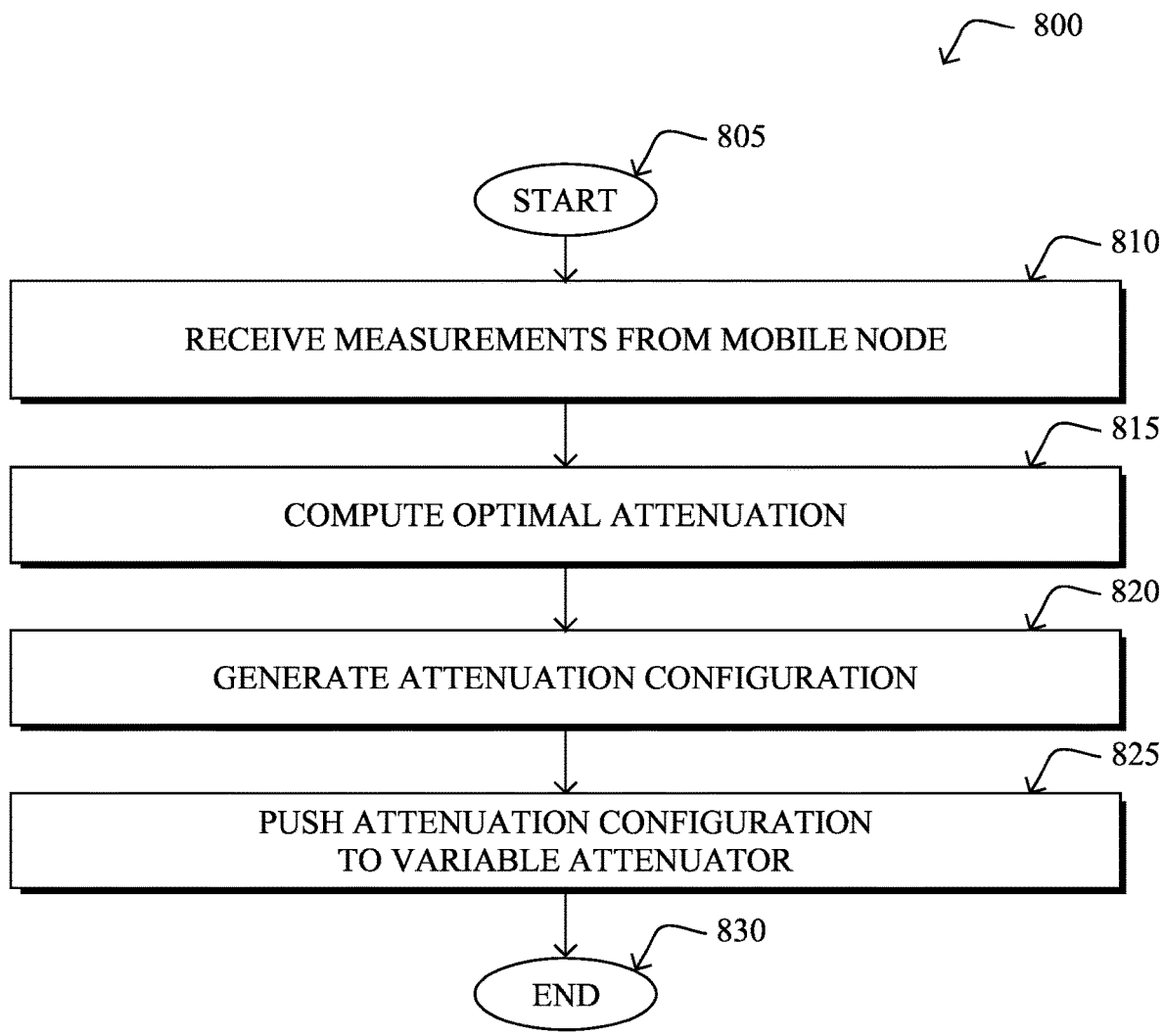
FIG. 8 illustrates an example simplified procedure for pushing a configuration to a variable attenuator of a node in a wireless network.

FIG. 8 illustrates an example simplified procedure for pushing a configuration to a variable attenuator of a node in a wireless network, in accordance with one or more embodiments described herein. For instance, procedure 800 may be performed by a device (e.g., device 200) that executes stored instructions (e.g., attenuation adjustment process 248), to provide a supervisory service to one or more wireless nodes of a wireless network. Such a network may, in various embodiments, comprise a plurality of mobile nodes (e.g., nodes located on moving vehicles, etc.). The procedure 800 may start at step 805, and continues to step 810, where, as described in greater detail above, the supervisory service may receive wireless signal quality measurements obtained by a particular node of a wireless network. For instance, the supervisory service may receive RSSI measurements, LER measurements, PER measurements, throughput measurements, or the like, that are associated with the particular node.

At step 815, as detailed above, the supervisory service may compute, based on the wireless signal quality measurements, an optimal amount of radio frequency attenuation that the particular node should use. In general, the supervisory service may do so by seeking to optimize an objective function that is a function of one or more of the signal quality metrics. For instance, one objective function may seek to ensure that the RSSI level between the particular node and an AP remain substantially constant (e.g., within a few dB), as the particular node moves towards or away from the AP. In other cases, the objective function may seek to minimize the LER, PER, etc. experienced by the particular node or across a plurality of the wireless nodes in the network. In some embodiments, the supervisory service may also leverage a machine learning model to determine the optimal attenuation for the particular node by modeling the relationships between the possible attenuation values and the signal quality metrics.

At step 820, the supervisory service may generate an attenuation configuration for the particular node that specifies the optimal amount of radio frequency attenuation that the particular node should use, as described in greater detail above. In a simple case, the attenuation configuration may specify the computed amount of attenuation, indicating that the particular node should use this amount of attenuation until further notice. In more complicated implementations, the attenuation configuration may be conditional on factors such as the time of day, the location of the particular node, the number of nodes in the area, or the like. Such a configuration could also indicate multiple attenuation values that the particular node should use under different conditions.

At step 825, as detailed above, the supervisory service may push the attenuation configuration to the particular node. In instances in which the supervisory service is a remote service, this may entail sending the attenuation configuration to the particular node via the network, which is then translated into control commands for its variable attenuator. In instances in which the supervisory service is executed locally by the node or vehicle hosting the node, this may simply entail sending the configuration to the relevant circuitry in charge of controlling the variable attenuator of the node, directly. Procedure 800 then ends at step 830.

It should be noted that while certain steps within procedure 800 may be optional as described above, the steps shown in FIG. 8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for the reduction of interference conditions in a wireless network though the control of variable attenuators located on nodes of the wireless network. By monitoring the signal quality metrics of the network and correlating these measurements with attenuator settings, the techniques herein can optimize the functioning of the wireless network by selecting the optimal amount of attenuation that any given node in the network should use.

While there have been shown and described illustrative embodiments for a mitigating interference in a wireless network using variable attenuators, it is to be understood that various other adaptations and modifications may be made within the intent and scope of the embodiments herein. For example, while the techniques herein are described primarily with respect to certain types of network deployments (e.g., trains, autonomous vehicles, etc.), the techniques herein are not limited as such and can be employed for a number of other use cases. Further, while certain protocols are used herein for illustrative purposes, the techniques herein can also be implemented using other suitable protocols, as well.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method comprising:
    receiving, at a supervisory process, wireless signal quality measurements obtained by a particular node of a wireless network, the wireless network comprising a plurality of mobile nodes;
    computing, by the supervisory process and based on the wireless signal quality measurements, an optimal amount of radio frequency attenuation that the particular node should use;
    generating, by the supervisory process, an attenuation configuration for the particular node that specifies the optimal amount of radio frequency attenuation that the particular node should use; and
    pushing, by the supervisory process, the attenuation configuration to a variable attenuator of the particular node, wherein the attenuation configuration causes the variable attenuator to increase radio frequency attenuation as the particular node approaches an access point of the wireless network.

2. The method as in claim 1, wherein the wireless signal quality measurements comprise one or more of: a received signal strength indicator (RSSI) measurement, a link error rate (LER) measurement, a packet error rate (PER) measurement, or a throughput measurement.

3. The method as in claim 1, further comprising:
    receiving, at the supervisory process, location data associated with the wireless signal quality measurements and indicative of one or more physical locations of the particular node, wherein the attenuation configuration specifies the optimal amount of radio frequency attenuation that the particular node should use at a given location.

4. The method as in claim 1, wherein the supervisory process pushes the attenuation configuration to the variable attenuator of the particular node via the wireless network.

5. The method as in claim 1, wherein the radio frequency attenuation is increased as the particular node approaches the access point, to keep a received signal strength indicator (RSSI) with the access point substantially constant.

6. The method as in claim 1, wherein the particular node is a first mobile node in the plurality of mobile nodes, the first mobile node and a second mobile node in the plurality of mobile nodes are located on a moving vehicle, and wherein computing the optimal amount of radio frequency attenuation comprises:
    computing the optimal amount of radio frequency attenuation so as to minimize channel interference between the first mobile node and the second mobile node.

7. The method as in claim 6, wherein the moving vehicle is a train, and wherein the first mobile node and the second mobile node are located on different cars of the train.

8. The method as in claim 1, wherein mobile nodes in the plurality of mobile nodes communicate using overlapping frequencies.

9. The method as in claim 1, wherein the particular node comprises an access point for the wireless network.

10. An apparatus, comprising:
    one or more network interfaces;
    a processor coupled to the one or more network interfaces and configured to execute one or more processes; and
    a memory configured to store a process that is executable by the processor, the process when executed configured to:
        receive wireless signal quality measurements obtained by a particular node of a wireless network, the wireless network comprising a plurality of mobile nodes;
        compute, based on the wireless signal quality measurements, an optimal amount of radio frequency attenuation that the particular node should use;
        generate an attenuation configuration for the particular node that specifies the optimal amount of radio frequency attenuation that the particular node should use; and
        push the attenuation configuration to a variable attenuator of the particular node, wherein the attenuation configuration causes the variable attenuator to increase radio frequency attenuation as the particular node approaches an access point of the wireless network.

11. The apparatus as in claim 10, wherein the wireless signal quality measurements comprise one or more of: a received signal strength indicator (RSSI) measurement, a link error rate (LER) measurement, a packet error rate (PER) measurement, or a throughput measurement.

12. The apparatus as in claim 10, wherein the process when executed is further configured to:
    receive location data associated with the wireless signal quality measurements and indicative of one or more physical locations of the particular node, wherein the attenuation configuration specifies the optimal amount of radio frequency attenuation that the particular node should use at a given location.

13. The apparatus as in claim 10, wherein the apparatus pushes the attenuation configuration to the variable attenuator of the particular node via the wireless network.

14. The apparatus as in claim 10, wherein the radio frequency attenuation is increased as the particular node approaches the access point, to keep a received signal strength indicator (RSSI) with the access point substantially constant.

15. The apparatus as in claim 10, wherein the particular node is a first mobile node in the plurality of mobile nodes, the first mobile node and a second mobile node in the plurality of mobile nodes are located on a moving vehicle, and wherein the apparatus computes the optimal amount of radio frequency attenuation by:

computing the optimal amount of radio frequency attenuation so as to minimize channel interference between the first mobile node and the second mobile node.

16. The apparatus as in claim 15, wherein the moving vehicle is a train, and wherein the first mobile node and the second mobile node are located on different cars of the train.

17. The apparatus as in claim 10, wherein the particular node comprises an access point for the wireless network.

18. A tangible, non-transitory, computer-readable medium storing program instructions that cause a device to execute a process comprising:

receiving wireless signal quality measurements obtained by a particular node of a wireless network, the wireless network comprising a plurality of mobile nodes;

computing, based on the wireless signal quality measurements, an optimal amount of radio frequency attenuation that the particular node should use;

generating an attenuation configuration for the particular node that specifies the optimal amount of radio frequency attenuation that the particular node should use; and pushing the attenuation configuration to a variable attenuator of the particular node, wherein the attenuation configuration causes the variable attenuator to increase radio frequency attenuation as the particular node approaches an access point of the wireless network.

\* \* \* \* \*